United States Patent
Yahner et al.

(10) Patent No.: US 11,180,172 B2
(45) Date of Patent: Nov. 23, 2021

(54) SYSTEMS AND METHODS FOR A UNIVERSAL MOUNT AND UNIVERSAL FRAME ON A MATERIAL HANDLING VEHICLE

(71) Applicant: The Raymond Corporation, Greene, NY (US)

(72) Inventors: Joseph Thomas Yahner, Chenango Forks, NY (US); Jeffrey Joseph Kuss, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 16/417,014

(22) Filed: May 20, 2019

(65) Prior Publication Data

US 2019/0351927 A1 Nov. 21, 2019

Related U.S. Application Data

(60) Provisional application No. 62/674,270, filed on May 21, 2018.

(51) Int. Cl.
*B62B 3/02* (2006.01)
*B66F 9/06* (2006.01)
(Continued)

(52) U.S. Cl.
CPC ............... *B62B 3/02* (2013.01); *B66F 9/061* (2013.01); *B66F 9/07513* (2013.01); *B66F 9/12* (2013.01)

(58) Field of Classification Search
CPC .......... B66F 9/06; B66F 9/07504; B66F 9/12; B62B 3/02; B62B 2207/04; B62B 2202/92
(Continued)

(56) References Cited

U.S. PATENT DOCUMENTS

| 3,822,803 A | 7/1974 | Thompson |
| 4,287,966 A * | 9/1981 | Frees ................. B66F 9/07504 180/14.1 |

(Continued)

FOREIGN PATENT DOCUMENTS

| CN | 105366594 A | 3/2016 |
| EP | 1134180 A2 | 9/2001 |

(Continued)

OTHER PUBLICATIONS

European Patent Office. Partial European Search Report for application 19175544.6, dated Oct. 17, 2019. 13 pages.

(Continued)

*Primary Examiner* — Ronald P Jarrett
(74) *Attorney, Agent, or Firm* — Quarles & Brady LLP

(57) ABSTRACT

Some aspects of the present disclosure provide a material handling vehicle configured for selectively coupling with any of a plurality of material handling attachments. In some configurations, the material handling vehicle includes a vehicle frame and a universal mounting assembly. The universal mounting assembly includes a universal mount coupled to the vehicle frame and having at least one linear actuator and at least one hinge, and a universal frame having at least one cradle rod pivotally coupled to the hinge and at least one bracket coupled to the linear actuator. Selective actuation of the at least one linear actuator pivots the universal frame relative to the vehicle frame.

16 Claims, 8 Drawing Sheets

(51) Int. Cl.
*B66F 9/075* (2006.01)
*B66F 9/12* (2006.01)

(58) Field of Classification Search
USPC .......................................................... 414/462
See application file for complete search history.

(56) References Cited

U.S. PATENT DOCUMENTS

| | | | | |
|---|---|---|---|---|
| 4,396,341 | A | * | 8/1983 | Brouwer ............ B66F 9/07563 410/3 |
| 4,488,850 | A | * | 12/1984 | Wernimont ........... E02F 3/3618 37/407 |
| 4,619,579 | A | | 10/1986 | Frison |
| 4,828,450 | A | | 5/1989 | Adamski |
| 5,127,791 | A | * | 7/1992 | Attman ................ B66F 9/0655 414/10 |
| 5,879,124 | A | * | 3/1999 | Brouwer ................ B66F 9/082 414/631 |
| 8,322,968 | B1 | * | 12/2012 | Mizner ................ B60P 1/4421 414/635 |
| 8,528,700 | B2 | | 9/2013 | Gobyn |
| 8,864,164 | B2 | | 10/2014 | Weiss |
| 9,045,321 | B2 | * | 6/2015 | Ford .................... B66F 9/07513 |
| 2007/0158279 | A1 | * | 7/2007 | Tyree ..................... B66F 9/142 211/13.1 |
| 2009/0051163 | A1 | * | 2/2009 | Frey ..................... E02F 9/2267 285/305 |
| 2014/0010622 | A1 | | 1/2014 | Mizner |
| 2018/0354761 | A1 | | 12/2018 | Addicott |

FOREIGN PATENT DOCUMENTS

| | | |
|---|---|---|
| EP | 3216749 A1 | 9/2017 |
| FR | 990937 A | 9/1951 |
| JP | 2001026396 A | 1/2001 |
| KR | 20150107387 A | 9/2015 |

OTHER PUBLICATIONS

European Patent Office, Extended European Search Report, Application No. 19175544.6, dated Mar. 24, 2020, 15 pages.

* cited by examiner

SYSTEMS AND METHODS FOR A UNIVERSAL MOUNT AND UNIVERSAL FRAME ON A MATERIAL HANDLING VEHICLE

CROSS-REFERENCES TO RELATED APPLICATIONS

This application is based on and claims priority to U.S. Provisional Patent Application No. 62/674,270, filed on May 21, 2018, and entitled "Systems and Methods for a Universal Mount and Universal Frame on a Material Handling Vehicle," the entire disclosure of which is incorporated herein by reference.

STATEMENT REGARDING FEDERALLY SPONSORED RESEARCH

Not Applicable.

BACKGROUND

Currently, warehouses employing the use of material handling vehicles to carry out various tasks are required to maintain a fleet of different material handling vehicles. For example, a warehouse may require one vehicle for moving loads at floor level, one vehicle for putting loads away on a rack or conveyer, and another vehicle for towing carts.

BRIEF SUMMARY

The present disclosure relates generally to material handling vehicles and, more specifically, to a material handling vehicle that is configured as a multi-purpose material handling vehicle.

In one aspect, the present disclosure provides a material handling vehicle configured for selectively coupling with any of a plurality of material handling attachments. The material handling vehicle includes a vehicle frame and a universal mounting assembly. The universal mounting assembly includes a universal mount coupled to the vehicle frame and having at least one linear actuator and at least one hinge, and a universal frame having at least one cradle rod pivotally coupled to the hinge and at least one bracket coupled to the linear actuator. Selective actuation of the at least one linear actuator pivots the universal frame relative to the vehicle frame.

In one aspect, the present disclosure provides a material handling vehicle that includes a vehicle frame, a mast assembly coupled to a first end of the vehicle frame, and a tugging hitch coupled to a second end of the vehicle frame opposite to the first end. At least one of the mast assembly and the tugging hitch is coupled to the vehicle frame by a universal mounting assembly. The universal mounting assembly includes a universal mount coupled to the vehicle frame having at least one linear actuator and at least one hinge, and a universal frame having at least one cradle rod pivotally coupled to the hinge and at least one bracket coupled to the linear actuator. Selective actuation of the at least one linear actuator pivots the universal frame relative to the vehicle frame.

In one aspect, the present disclosure provides a universal mount assembly for use with a material handling vehicle including a vehicle frame. The universal mount assembly may be configured for selective coupling between the material handling vehicle and any of a plurality of material handling attachments. The universal mount assembly may comprise a universal mount and a universal frame. The universal mount may be configured to be coupled to the vehicle frame and may include at least one hydraulic actuator and at least one cradle mechanism. The universal frame may be configured for attachment with any of the plurality of material handling attachments and may include at least one protrusion and at least one engagement mechanism. The at least one protrusion may be selectively coupled to the at least one cradle mechanism and the at least one engagement mechanism may be selectively coupled to the at least one hydraulic actuator.

In one aspect, the present disclosure provides a method for coupling a material handling vehicle to a universal frame. The material handling vehicle may include a vehicle frame and a universal mount. The universal mount may be coupled to the vehicle frame and may include at least one hydraulic actuator and at least one cradle mechanism. The universal frame may be configured for attachment with any of the plurality of material handling attachments and may include at least one protrusion and at least one actuator-engagement element. The method may comprise aligning the at least one cradle mechanism of the universal mount with the at least one protrusion of the universal frame. The method may further comprise coupling the at least one cradle mechanism to the at least one protrusion. The method may further comprise extending the at least one hydraulic actuator to align the at least one hydraulic actuator with the at least one actuator-engagement element. The method may further comprise coupling the at least one hydraulic actuator with the at least one actuator engagement element. The method may further comprise retracting the at least one hydraulic actuator to lift the universal frame.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
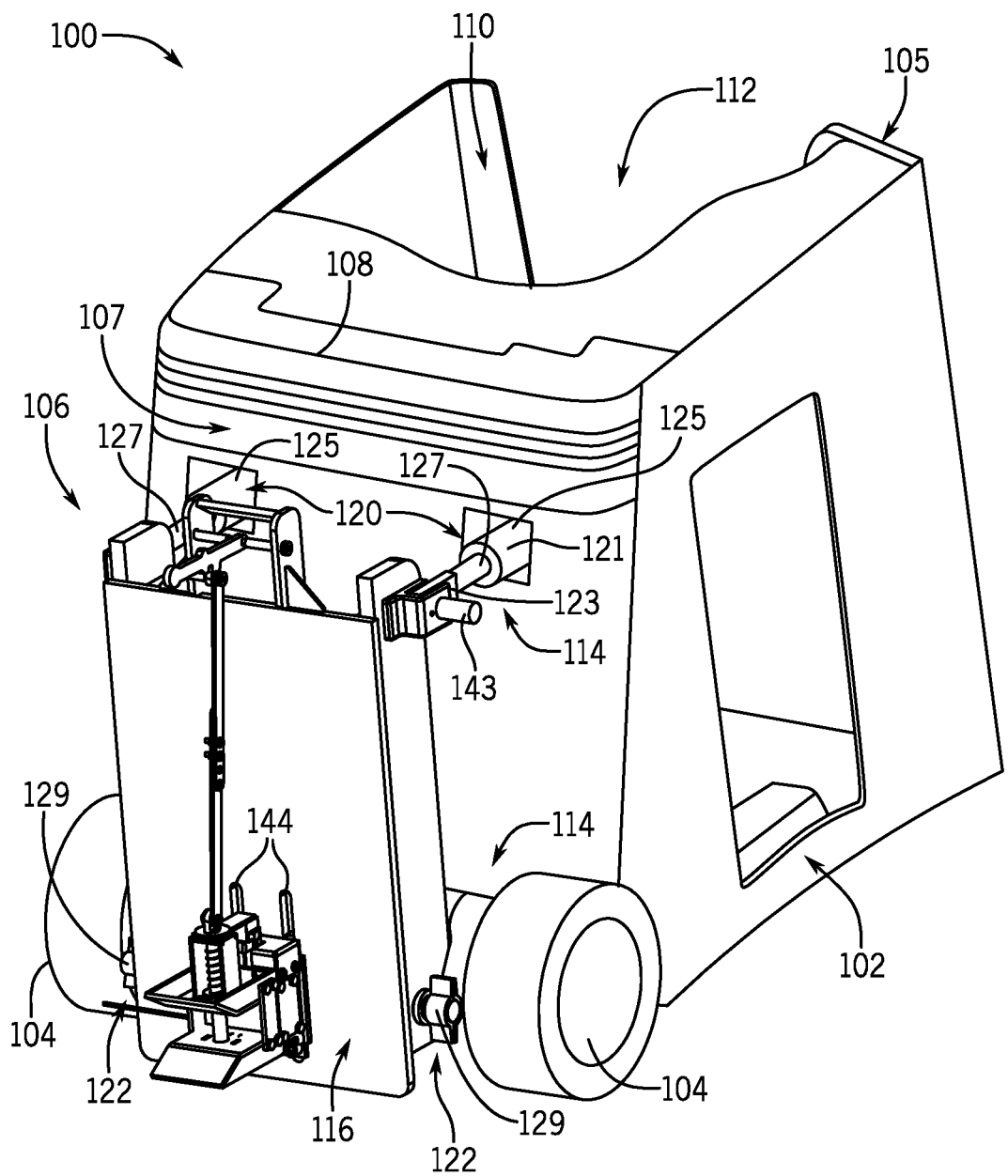
FIG. 1 is a top, front, right isometric view of a material handling vehicle having a universal mount attached to a universal frame coupled to an exemplary towing attachment according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the invention. Various modifications to the illustrated aspects will be readily apparent to those skilled in the art, and the generic principles herein can be applied to other aspects and applications without departing from aspects of the invention. Thus, aspects of the invention are not intended to be limited to aspects shown, but are to be accorded the widest scope consistent with the principles and features disclosed herein. The following detailed description is to be read with reference to the figures, in which like elements in different figures have like reference numerals. The figures, which are not necessarily to scale, depict selected aspects and are not intended to limit the scope of aspects of the invention. Skilled artisans will recognize the examples provided herein have many useful alternatives and fall within the scope of aspects of the invention.

It is to be appreciated that material handling vehicles are designed in a variety of configurations to perform a variety of tasks. The various configurations of material handling vehicles described herein are shown by way of example. It will be apparent to those of skill in the art that the present invention is not limited to vehicles of these types, and can also be provided in various other types of material handling vehicle configurations, including for example, orderpickers, reach vehicles, counterbalanced vehicles, and any other lift vehicles. The various aspects disclosed herein are suitable for all of driver controlled, pedestrian controlled, remotely controlled, and autonomously controlled material handling vehicles.

FIG. 1 illustrates one non-limiting example of a material handling vehicle 100 according to the present disclosure. The material handling vehicle 100 may include a vehicle frame 102, traction wheels 104, and a universal mounting assembly 106. The vehicle frame 102 may include a power section 108 and an operator compartment 110. The power section 108 may be disposed within the vehicle frame 102 and may include a battery (not shown) configured to supply power to various components of the material handling vehicle 100. For example, the battery may supply power to a motor (not shown) and/or a transmission (not shown) disposed within the power section 108 and configured to drive the traction wheels 104. In the illustrated non-limiting example, the traction wheels 104 are arranged under the power section 108. In other non-limiting examples, the traction wheels 104 may be arranged in another location under the vehicle frame 102.

The operator compartment 110 may include a handle (not shown) configured to allow an operator to control a speed and direction of travel of the material handling vehicle 100. In some non-limiting examples, the handle may be configured to manually steer and power the traction wheels 104. In some non-limiting examples, the handle may be removably coupled to the operator compartment 110 to enable an operator to remotely (i.e., from outside of the material handling vehicle 100) train the material handling vehicle 100 for operation as an autonomously guided vehicle (AGV). In some non-limiting examples, the handle may be removably connected to the operator compartment 110 via a quick-disconnect (e.g., a pin and plug). In some non-limiting examples, the handle, once removed from the material handling vehicle 100, may be configured to communicate wirelessly with a controller (not shown) on board the material handling vehicle 100.

In the illustrated non-limiting example shown in FIG. 1, the material handling vehicle 100 includes the operator compartment 110 arranged rearward of the power section 108 and having an operator opening 112 that opens toward a rear end 105 of the material handling vehicle 100. In some non-limiting examples, the material handling vehicle may be designed with the operator compartment arranged differently (see, e.g., FIG. 8).

Figure 2:
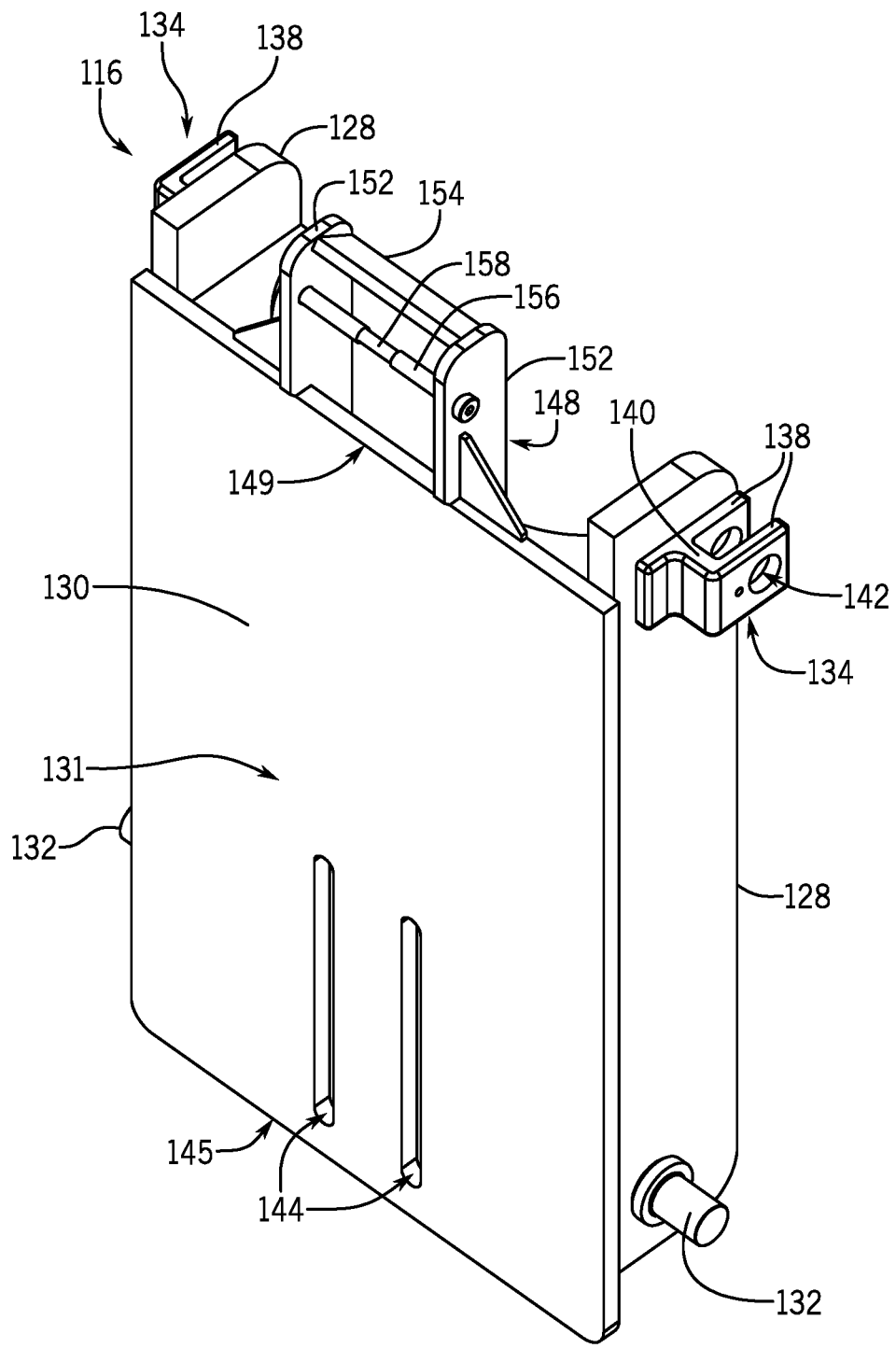
FIG. 2 is a partial top, front, right isometric view of the universal frame of FIG. 1 according to aspects of the present disclosure.

In general, the universal mounting assembly 106 facilitates the coupling of various material handling attachments to an existing material handling vehicle (e.g., the material handling vehicle 100 or the material handling vehicle 200 (see, e.g., FIG. 2). The universal mounting assembly 106 includes a structure that is coupled to or integrated with a frame on a material handling vehicle and a plate/frame assembly that may be coupled to the structure. The plate/frame assembly may be designed to removably couple to one or more of the material handling attachments. In the illustrated non-limiting example, the universal mounting assembly 106 may include a universal mount 114 coupled to a universal frame 116. Generally, the universal mount 114 may provide a pivotal coupling between the material handling vehicle 100 and the universal frame 116, such that the universal frame 116 may be selectively pivoted relative to the material handling vehicle 100 in a desired direction. In some non-limiting examples, the universal mount 114 may include a movable portion and a fixed pivotal point that are vertically separated (e.g., in a direction perpendicular to a floor on which the material handling vehicle 100 travels) from one another to enable the movable portion to displace the universal frame 116 about the fixed pivotal point and relative to the material handling vehicle 100.

In the illustrated non-limiting example, the universal mount 114 includes an actuation mechanism 120 and a cradle mechanism 122. The actuation mechanism 120 may be coupled to the power section 108 of the material handling vehicle 100, and may be further selectively coupled to the universal frame 116 (e.g., when it is desired to use the universal frame 116) by a pivot plate 123. The actuation mechanism 120 may comprise a pair of selectively extendable and retractable (e.g., actuatable) linear actuators 121 disposed at or near a top (e.g., from the perspective of FIG. 1) of a front end 107 of the vehicle frame 102. The linear actuators 121 may be laterally separated from one another and each coupled to a respective side of the universal frame 116. In the illustrated non-limiting example, the linear actuators 121 extend through and protrude from the top of the front end 107 to facilitate coupling to the universal frame 116. In some non-limiting examples, the linear actuators 121 may be hydraulically actuated, for example, via selective connection to a pump housed within the vehicle frame 102. In the illustrated non-limiting example, the linear actuators 121 may each include a cylinder 125 and a rod 127. The cylinder 125 may be fixed to an internal structure (e.g., a strut, a beam, a panel, etc.) within the vehicle frame 102. The rod 127 may be coupled to the pivot plate 123. In general, the coupling between the rod 127 and the pivot plate 123 may allow the universal frame 116 to pivot about the cradle mechanism 122. In some non-limiting examples, a ball-joint-like coupling may exist between the rod 127 and the pivot plate 123. The rod 127 may also be movable between an extended position and a retracted position within the cylinder. The movement of the rod 127 between the extended and retracted positions may pivot the universal frame 116 about the cradle mechanism 122 and relative to the material handling vehicle 100.

In some non-limiting examples, the actuation mechanism 120 may include a single selectively extendable and retractable linear actuator. In other non-limiting examples, the actuation mechanism 120 may additionally or alternatively include other actuatable mechanisms, such as, one or more linear motors, one or more scissor jack mechanisms, one or more electric actuators, one or more pneumatic actuators, or any other suitable actuatable mechanisms configured to actuate the universal frame 116 pivotally about the cradle mechanism 122.

The cradle mechanism 122 may be coupled at or near a bottom (e.g., from the perspective of FIG. 1) of the front end 107 of the vehicle frame 102, and may further be selectively coupled (e.g., when it is desired to use the universal frame 116) to the universal frame 116. The cradle mechanism 122 may comprise a pair of hinges 129, which are laterally separated and pivotally coupled to opposing sides of the universal frame 116. In some non-limiting examples, the cradle mechanism 122 may alternatively include a single, centrally-disposed hinge. In other non-limiting examples, the cradle mechanism 122 may additionally or alternatively include other cradling mechanisms, such as a pair of U-shaped channels or any other suitable cradle mechanisms configured to pivotally couple to the universal frame 116.

Figure 3:
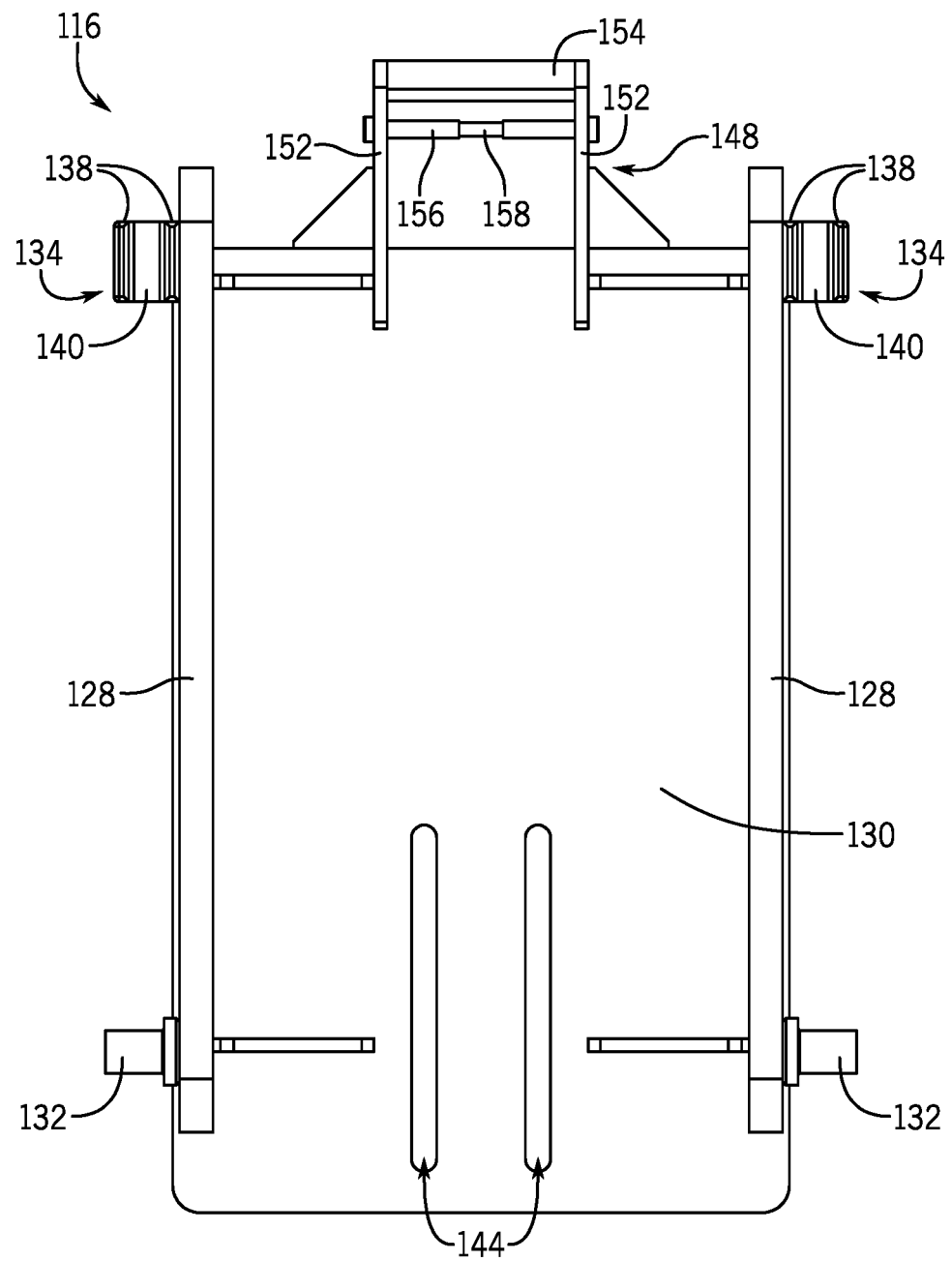
FIG. 3 is a back plan view of the universal frame of FIG. 2 according to aspects of the present disclosure.

With reference FIGS. 2 and 3, the universal frame 116 may include a pair of sidewalls 128 connected by a central portion 130. The central portion 130 may be a single wall disposed at a front end 131 of the universal frame 116. Each of the pair of sidewalls 128 may include a cradle rod 132 and a bracket 134. The cradle rods 132 may protrude laterally outwardly from each of the respective sidewalls 128 and may be configured to be received by and pivotally coupled to the hinges 129 of the universal mount 114. The pivotal coupling between the cradle rods 132 and the hinges 129 may be achieved via clips, pins, brackets, snap-rings, or any other suitable coupling method to enable the hinges 129 to be selectively installed to and removed from the cradle rods 132.

In general, the bracket 134 may be configured to selectively couple to the actuation mechanism 120 of the universal mount 114. In the illustrated non-limiting example, the bracket 134 comprises a U-shaped channel having a pair of spaced-apart sidewalls 138 connected by an intermediate wall 140. The pair of spaced-apart sidewalls 138 may be spaced apart such that the pivot plate 123 of the actuation mechanism 120 can be received therebetween. Each of the brackets 134 further includes an engagement aperture 142 extending laterally through each of the sidewalls 138. The engagement aperture 142 may be configured to pivotally engage a pivot plate rod 143 (see, e.g., FIG. 1) of the pivot plate 123. For example, the pivot plate rod 143 may extend at least partially into and through the engagement aperture 142 and a pin and snap-ring may be used to pivotally retain the pivot plate rod 143 within the engagement aperture 142.

The central portion 130 may include a pair of coupling slots 144 configured to selectively couple the universal frame 116 to a material handling attachment or a warehouse object, as will be described below. In the illustrated non-limiting example, the pair of coupling slots 144 may be disposed centrally on the central portion 130, proximate a lower end 145 of the central portion 130. In some non-limiting examples, the pair of coupling slots 144 may be disposed elsewhere on the central portion 130. The coupling slots 144 extend in a vertical direction (e.g., from the perspective of FIGS. 3 and 4) along a portion of the central portion 130.

The central portion 130 may include a crossbar arrangement 148 disposed at an upper end 149. The crossbar arrangement 148 may include a pair of laterally spaced extensions 152, a stability crossbar 154, and an actuation crossbar 156. The extensions 152 may be coupled to the central portion 130 and may extend upward therefrom. The stability crossbar 154 may extend between the extensions 152 at or near a top of the extensions 152. The actuation crossbar 156 may extend between the extensions 152 below the stability crossbar 154 and may include a central notch 158 radially recessed into the actuation crossbar 156. The actuation crossbar 156, and specifically the central notch 158, may be configured to couple to a variety of selective actuation mechanisms configured to actuate any given one of the plurality of material handling attachments, as will be described below.

Figure 4:
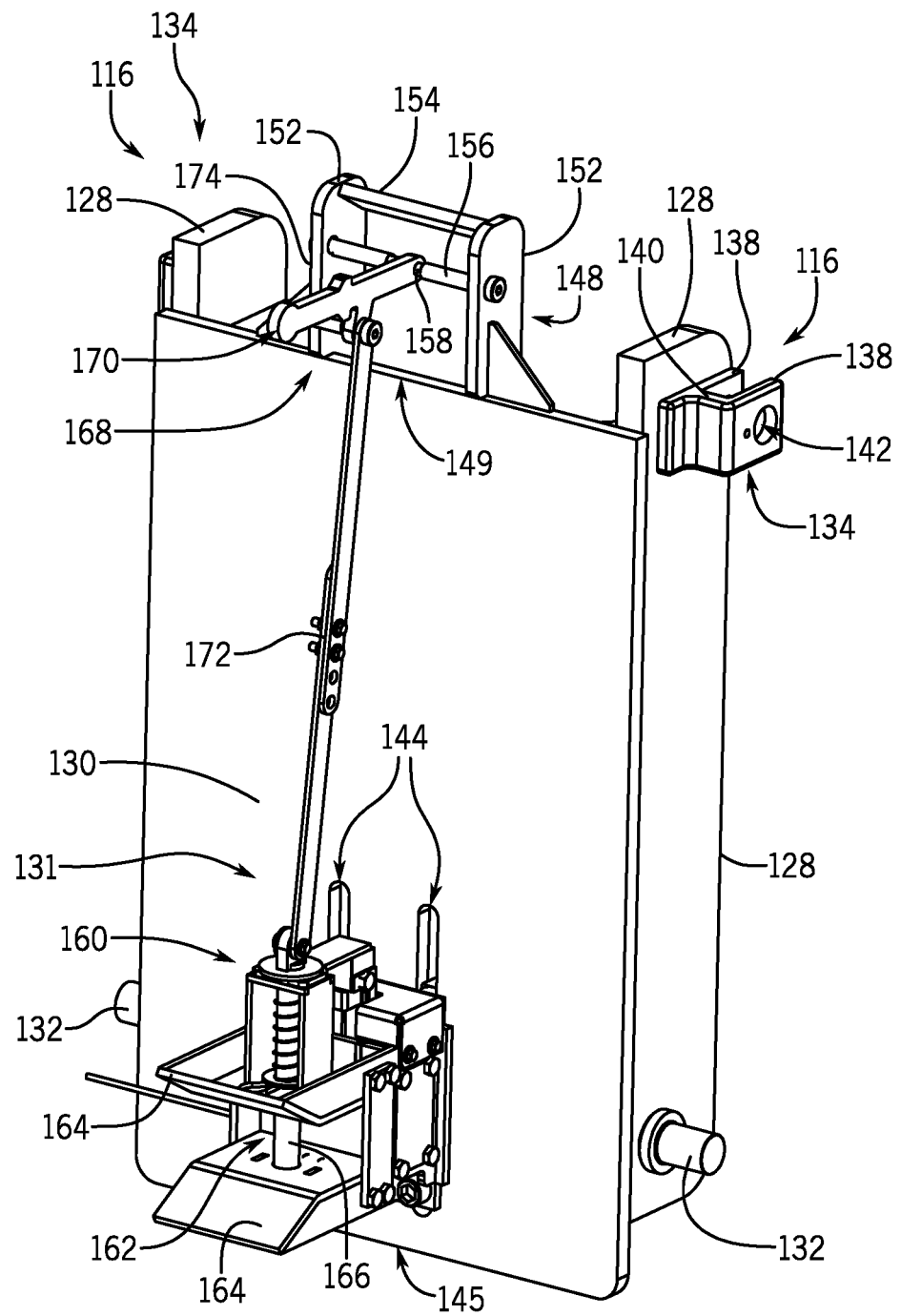
FIG. 4 is a top, front, right isometric view of an exemplary towing attachment coupled to the universal frame of FIG. 1 according to aspects of the present disclosure.
Figure 5:
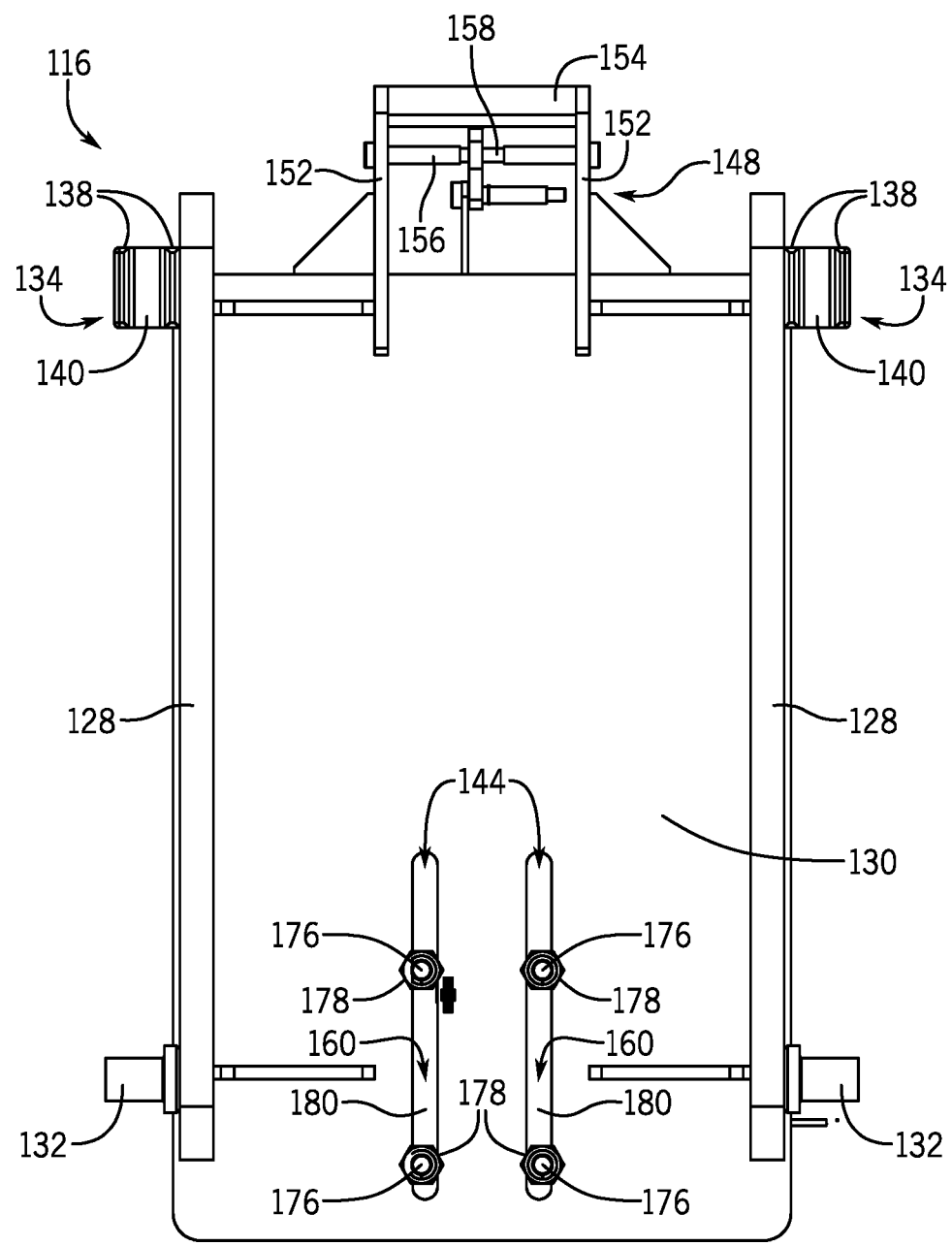
FIG. 5 is a back plan view of the exemplary towing attachment coupled to the universal frame of FIG. 4 according to aspects of the present disclosure.

As described herein, the universal frame 116 may be coupled to a plurality of different material handling attachments or warehouse objects to perform various warehouse tasks using the material handling vehicle 100. With reference to FIGS. 4-5, a non-limiting example of a material handling attachment that may be coupled to the universal frame 116 is illustrated. As illustrated, the universal frame 116 may be coupled to a tugger attachment 160 to perform towing tasks within a warehouse. The tugger attachment 160 may include an engagement slot 162 formed between a pair of engagement arms 164 and a tugger rod 166. The engagement slot 162 and the pair of engagement arms 164 may be configured to receive a corresponding towable element (not shown) on any of a variety of towable items. The tugger rod 166 may extend between the pair of engagement arms 164 and may be configured to selectively engage the corresponding towable element.

The tugger attachment 160 may additionally include a selective actuation mechanism 168 configured to selectively actuate the tugger rod 166 into and out of engagement with the corresponding towable element. The selective actuation mechanism 168 may include an actuation handle 170 and an actuation member 172. The actuation handle 170 may include a handle portion 174 at a first end and may be rotatably coupled to the central notch 158 of the actuation crossbar 156 at a second end, opposite the first end. The actuation handle 170 may additionally be rotatably coupled to the actuation member 172 at a generally central location of the actuation handle 170. The actuation member 172 may extend between and be rotatably coupled to each of the actuation handle 170, as described above, as well as the tugger rod 166. As such, the handle portion 174 of the actuation handle 170 can be moved to selectively actuate the tugger rod 166 into and out of engagement with the corresponding towable element.

As shown in FIG. 5, the tugger attachment 160 may be coupled to the pair of coupling slots 144 of the central portion 130 of the universal frame 116 using threaded fasteners 176 and corresponding threaded nuts 178. The threaded fasteners 176 may extend rearwardly from a rear surface 180 of the tugger attachment 160, and may be spaced to match a spacing between the pair of coupling slots 144. With the threaded fasteners 176 disposed within the pair of coupling slots 144, the tugger attachment 160 can be secured to the central portion 130 of the universal frame 116 by tightening the threaded nuts 178 onto the threaded fasteners 176.

In the illustrated non-limiting example, there are four threaded fasteners 176 and four threaded nuts 178. In other non-limiting examples, there may be more or less than four threaded fasteners and threaded nuts, as desired for a given application.

Figure 6:
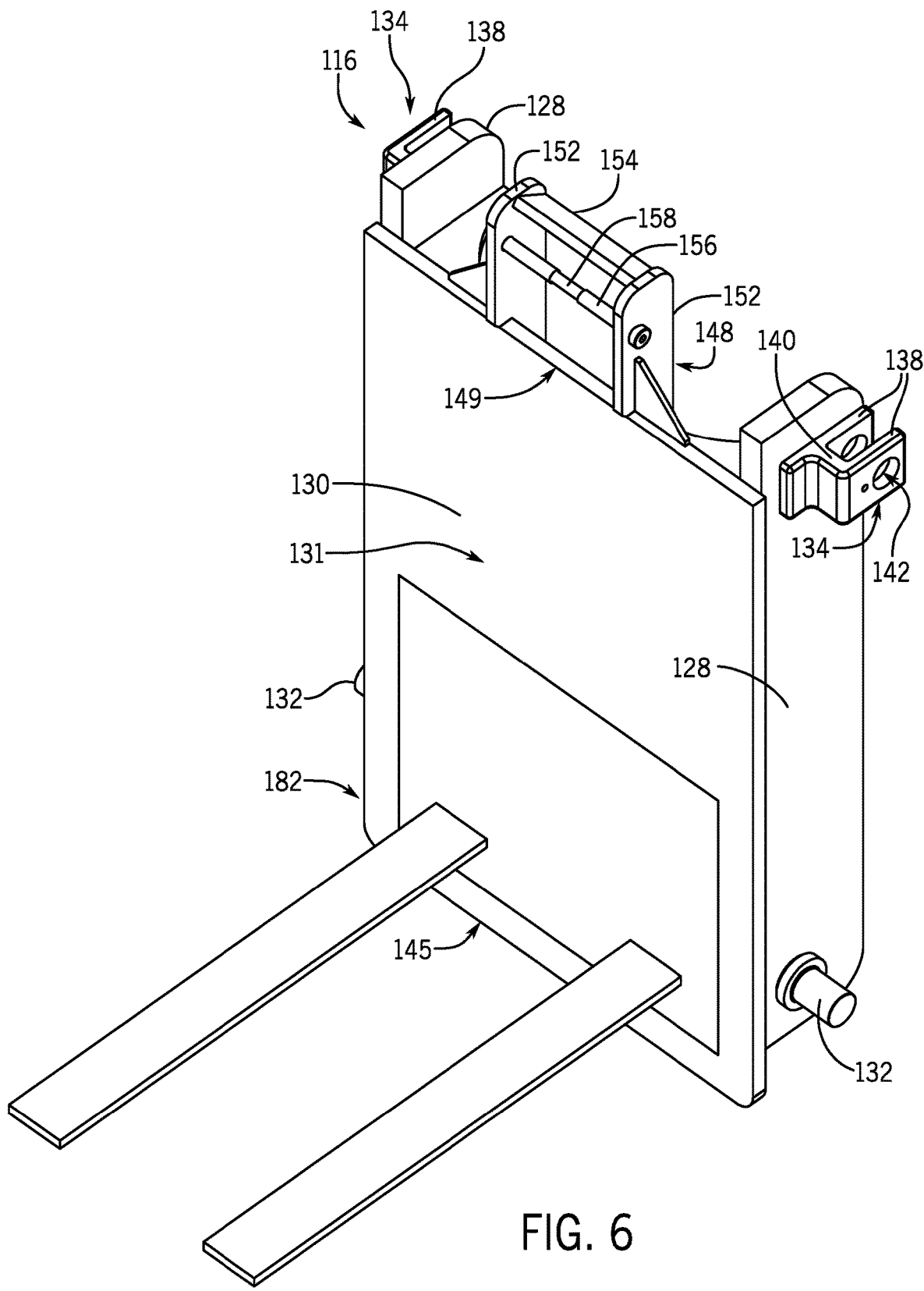
FIG. 6 is a top, front, right isometric view of an exemplary pallet fork attachment coupled to the universal frame of FIG. 1 according to aspects of the present disclosure.
Figure 7:
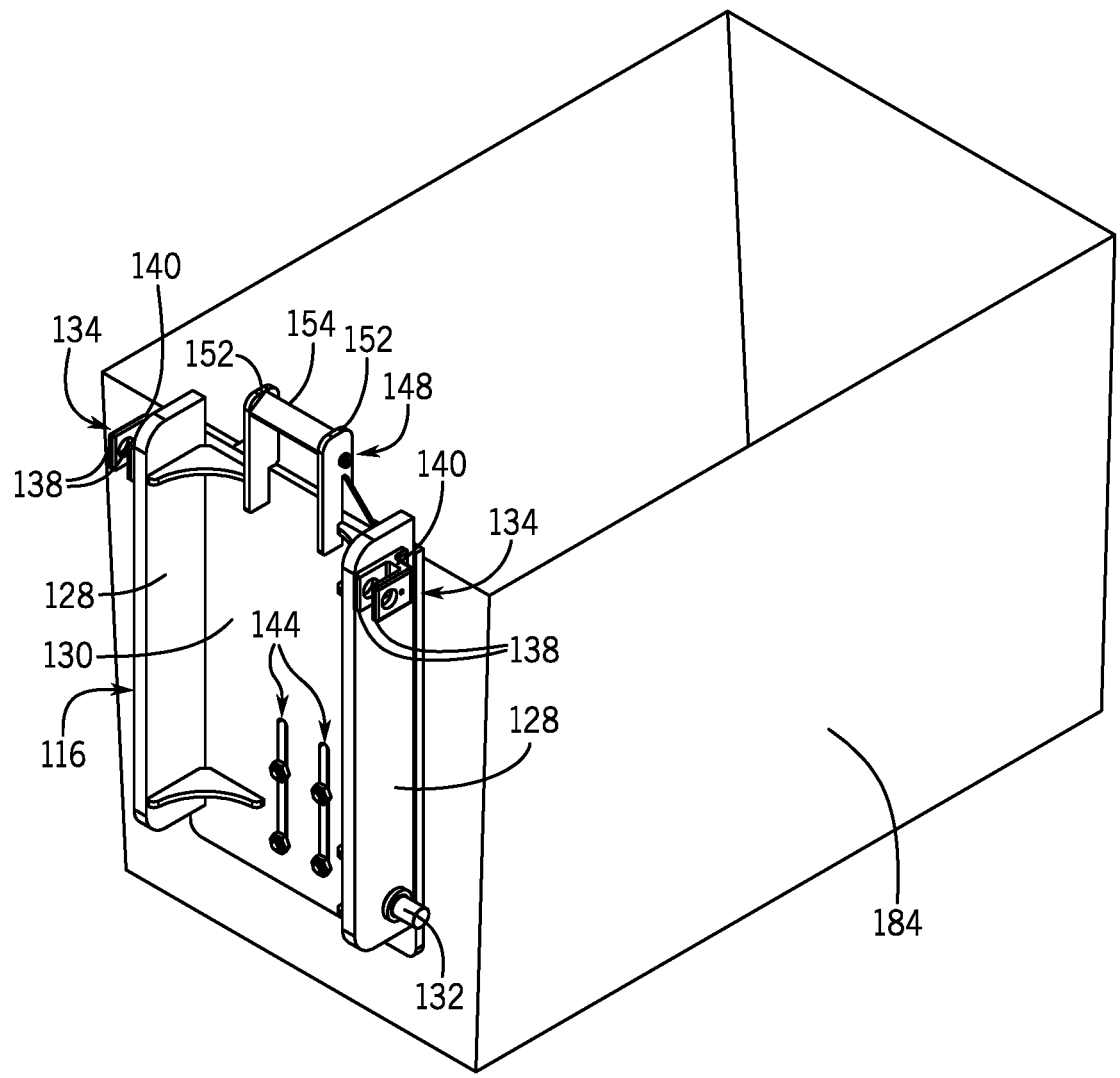
FIG. 7 is a top, back, right isometric view of the universal frame of FIG. 1 shown coupled to a dumpster.

It will be understood by those skilled in the art that the tugger attachment 160 is provided as an exemplary material handling attachment, and that the universal frame 116 can alternatively be coupled to a plurality of different material handling attachments or other warehouse objects generally. For example, FIGS. 6 and 7 illustrate various non-limiting examples of material handling attachments and warehouse objects that can be coupled to the universal frame 116. For example, as illustrated in FIG. 6, a pallet fork attachment 182 may be coupled to the universal frame 116 to perform load transporting tasks within a warehouse. As illustrated in FIG. 7, the universal frame 116 may be coupled to a dumpster 184, such that the material handling vehicle 100 can pick up and drop off the dumpster 184 between various locations, via the universal frame 116.

Now that the various components of the material handling vehicle 100 having the universal mounting assembly 106 have been described above, a general description of operation of the universal mounting assembly 106 will be provided below. It will be understood that the following description is provided as an example and is in no way meant to be limiting.

During operation of the material handling vehicle 100, to pick up or couple to a desired material handling attachment or warehouse object, the material handling vehicle 100 may be driven, either manually or autonomously, into close proximity to a desired material handling attachment such that each of the cradle rods 132 are generally aligned with the hinges of the cradle mechanism 122 of the universal mount 114. The cradle rods 132 can then be coupled to the hinges of the cradle mechanism 122.

With the cradle rods 132 coupled to the hinges 129 of the cradle mechanism 122, the linear actuators 121 of the actuation mechanisms 120 may be actuated to the extended position to generally align the linear actuators 121 with the corresponding bracket 134. With the linear actuators 121 generally aligned with the brackets 134, the linear actuators 121 can then be coupled to the universal frame 116 by coupling the pivot plates 123 of the linear actuators 121 to the corresponding engagement apertures 142 of the brackets 134, which may be secured via a snap-ring and pin. With both the hinges 129 of the cradle mechanism 122 coupled to the cradle rods 132 and the linear actuators 121 coupled to the brackets 134, the linear actuators 121 can be retracted, thereby pivoting the universal frame 116 about the hinges 129 until a desired pitch (i.e., rotational orientation relative to the material handling vehicle 100) is reached. As such, the corresponding material handling attachment or warehouse object that is attached to the universal frame 116 is rotated and lifted away from the ground.

In some non-limiting examples, electrical or hydraulic connections may be provided between the material handling vehicle 100 and the desired material handling attachment or warehouse object. In these non-limiting examples, the electrical and/or hydraulic lines may be connected and disconnected to the material handling vehicle 100 via quick disconnects.

The material handling vehicle 100 with the desired material handling attachment or warehouse object coupled thereto may be configured to perform a desired warehouse application. The desired configuration of the material handling vehicle 100 may be used for the given warehouse application until it is desired to perform another application. To remove the desired material handling attachment or warehouse object from the material handling vehicle 100, the linear actuators 121 of the actuation mechanisms 120 can be extended, thereby pivoting the universal frame 116, and thereby the material handling attachment or warehouse object, about the hinges of the cradle mechanism 122, toward the ground. With the material handling attachment or warehouse object positioned on with the ground, the brackets 134 and the cradle rods 132 can each be selectively decoupled from the universal mount 114.

With the universal frame 116 decoupled from the universal mount 114, the material handling vehicle 100 can be driven away from, e.g., out from under, the desired material handling attachment or warehouse object and, for example, under another material handling attachment or warehouse object.

As such, a plurality of varying material handling attachments and warehouse objects can each be coupled to the universal frame 116, thereby allowing for the universal mount 114 of the material handling vehicle 100 to engage and disengage a variety of attachments or other objects, which allows one material handling vehicle to satisfy what would normally require a plurality of different material handling vehicles. The use of various material handling attachments on a single material handling vehicle 100 may reduce costs compared to purchasing different material handling vehicles for different applications, and may require less warehouse space for storage. Further, the selective coupling between the universal mount 114 and the universal frame 116 enable the selective changing of an installed material handling attachment, for example, by a single operator without a need for special tools. In addition, the universal mounting assembly 106 may be integrated into or coupled to the existing chassis/vehicle frame on a material handling vehicle, which minimizes design efforts and improves manufacturing efficiency. Further, the universal mounting assembly 106 enables the tugger attachment 160 to be attached to material handling vehicles that possess higher tugging capacity than conventional tow tractors. In this way, for example, existing material handling vehicles may be retrofitted as a heavy duty tow tractor.

Figure 8:
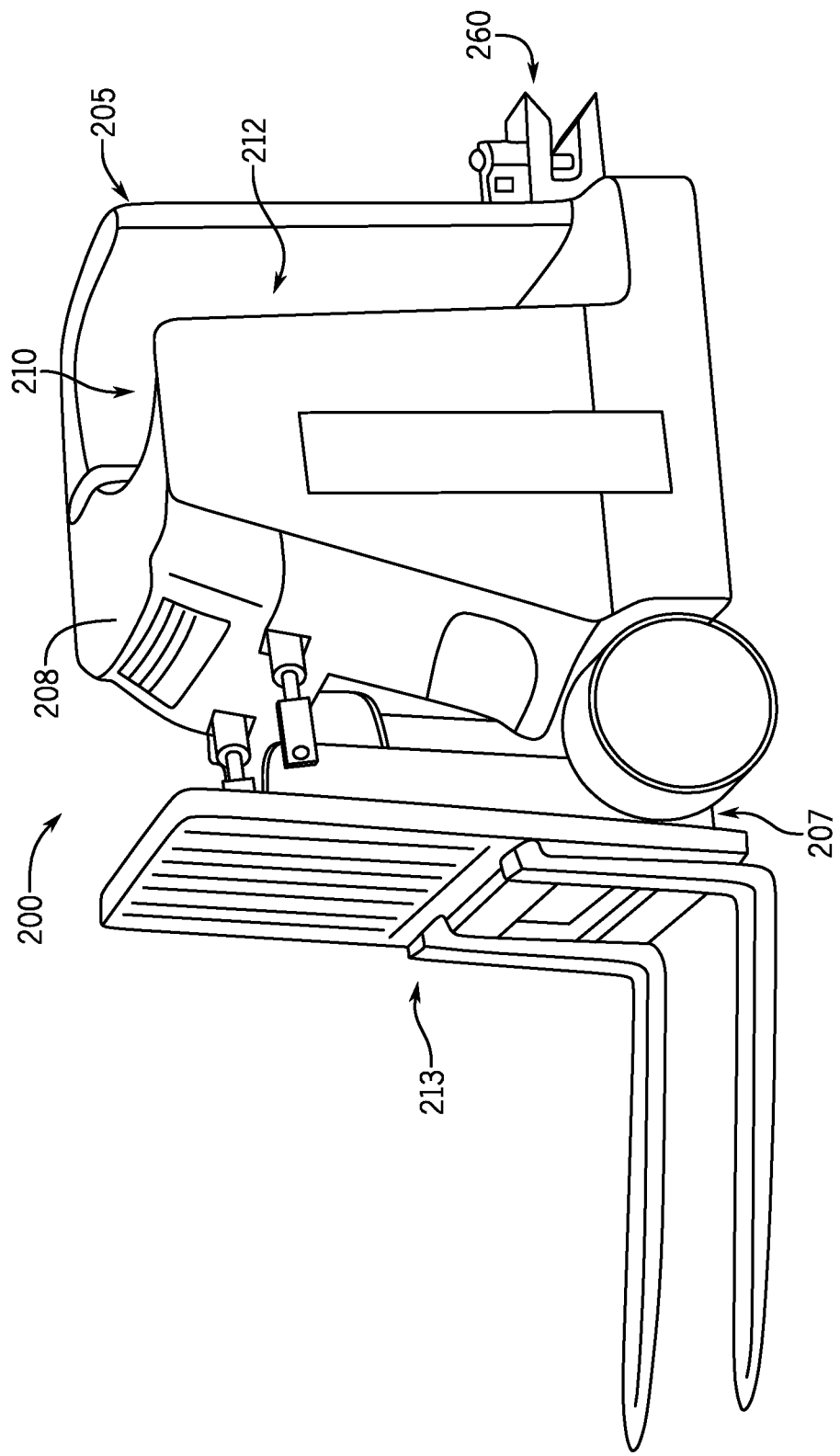
FIG. 8 is a top, front, left isometric view of a multi-purpose material handling vehicle according to aspects of the present disclosure.

In some non-limiting examples according to the present disclosure, an existing material handling vehicle may be reconfigured to include a tugger attachment installed on an opposing end of the vehicle relative to the forks, or mast. For example, FIG. 8 illustrates another non-limiting example of a material handling vehicle 200 according to the present disclosure. As illustrated, the material handling vehicle 200 may be designed with an operator compartment 210 similarly arranged rearward of a power section 208, but the operator compartment 210 may have an operator opening 212 that opens toward a lateral side of the material handling vehicle 200. As such, a tugging hitch 260 may be arranged on a first end 205 of the material handling vehicle 200, with a mast assembly 213 arranged on a second end 207 of the material handling vehicle 200. As such, the material handling vehicle 200 includes both the mast assembly 213 and the tugging hitch 260. In some other non-limiting examples, the tugging hitch 260 may be directly mounted onto the first end 205 of the material handling vehicle 200. In some non-limiting examples, the tugging hitch 260 may be coupled to the material handling vehicle 200 via the universal mounting assembly 106. In some non-limiting examples, the mast assembly 213 may be coupled to the material handling vehicle via the universal mounting assembly 106.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A material handling vehicle comprising:
a vehicle frame;
a universal mounting assembly comprising:
   a universal mount coupled to the vehicle frame including at least one linear actuator and at least two hinges;
   a universal frame including a front wall and a pair of sidewalls attached to laterally-opposing ends of the front wall, wherein each of the pair of sidewalls includes a cradle rod and a bracket attached thereto, each of the cradle rods protrudes laterally outwardly from a respective one of the pair of sidewalls; and
   a crossbar arrangement arranged at an upper end of the front wall and including an actuator crossbar extending laterally from a first extension wall to a second extension wall, wherein the actuator crossbar is configured to be coupled to an actuation mechanism of a tugging attachment, and
wherein the cradle rods are pivotally coupled to the at least two hinges and at least one of the brackets is coupled to the at least one linear actuator, wherein selective actuation of the at least one linear actuator pivots the universal frame relative to the vehicle frame.

2. The material handling vehicle of claim 1, wherein the at least one linear actuator comprises two linear actuators laterally spaced and extending from a top of a front end of the vehicle frame.

3. The material handling vehicle of claim 2, wherein each of the brackets is pivotally coupled to a corresponding one of the two linear actuators.

4. The material handling vehicle of claim 3, wherein each of the brackets comprises a U-shaped channel sized to receive a pivot plate coupled to a rod of the corresponding linear actuator.

5. The material handling vehicle of claim 4, wherein each pivot plate is pivotally coupled to the corresponding U-shaped channel of the corresponding bracket via a pivot plate rod extending at least partially into an engagement aperture formed in the corresponding bracket.

6. The material handling vehicle of claim 1, wherein the at least two hinges are laterally spaced and extending from a bottom of a front end of the vehicle frame.

7. The material handling vehicle of claim 1, wherein the front wall includes at least one attachment slot that extends through the front wall and is configured to receive a fastener therein.

8. The material handling vehicle of claim 7, wherein the at least one attachment slot comprises two laterally-spaced attachment slots that extend through the front wall.

9. The material handling vehicle of claim 7, wherein the fastener received within the attachment slot couples the tugging attachment to the universal frame.

10. A material handling vehicle comprising:
a vehicle frame;
a mast assembly coupled to a first end of the vehicle frame; and
a tugging hitch coupled to a second end of the vehicle frame opposite to the first end, wherein the tugging hitch is coupled to the vehicle frame by a universal mounting assembly, the universal mounting assembly comprising:
   a universal mount coupled to the vehicle frame including at least one linear actuator and at least one hinge; and
   a universal frame including a front wall, a pair of sidewalls, at least one cradle rod pivotally coupled to the hinge, and at least one bracket coupled to the linear actuator, wherein the at least one cradle rod is attached to and protrudes laterally outwardly from one of the pair of sidewalls, and wherein selective actuation of the at least one linear actuator pivots the universal frame relative to the vehicle frame.

11. The material handling vehicle of claim 10, wherein the at least one linear actuator comprises two linear actuators laterally spaced and extending from a top of a front end of the vehicle frame, and wherein the at least one bracket comprises two brackets arranged on opposing sides of the universal frame, each of the two brackets being pivotally coupled to a corresponding one of the two linear actuators.

12. The material handling vehicle of claim 11, wherein each of the two brackets comprises a U-shaped channel sized to receive a pivot plate coupled to a rod of the corresponding linear actuator.

13. The material handling vehicle of claim 12, wherein each pivot plate is pivotally coupled to the corresponding U-shaped channel of the corresponding bracket via a pivot plate rod extending at least partially into an engagement aperture formed in the corresponding bracket.

14. The material handling vehicle of claim 10, wherein the at least one hinge comprises two hinges laterally spaced and extending from a bottom of a front end of the vehicle frame, and wherein the at least one cradle rod comprises two cradle rods each of the two cradle rods protrudes laterally outwardly from a respective one of the pair of sidewalls, and each of the two cradle rods being pivotally coupled to a corresponding one of the hinges.

15. The material handling vehicle of claim 10, wherein a central portion extending between the pair of sidewalls includes at least one attachment slot that extends through the front wall and is configured to receive a fastener therein.

16. The material handling vehicle of claim 15, wherein the at least one attachment slot comprises two laterally-spaced attachment slots that extend through the front wall.

* * * * *